(12) United States Patent
Matsuyama

(10) Patent No.: US 7,190,095 B2
(45) Date of Patent: Mar. 13, 2007

(54) MOTOR

(75) Inventor: Youichi Matsuyama, Shinshiro (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 21 days.

(21) Appl. No.: 10/532,076

(22) PCT Filed: Oct. 20, 2003

(86) PCT No.: PCT/JP03/13385

§ 371 (c)(1),
(2), (4) Date: Apr. 21, 2005

(87) PCT Pub. No.: WO2004/038894

PCT Pub. Date: May 6, 2004

(65) Prior Publication Data

US 2006/0011012 A1    Jan. 19, 2006

(30) Foreign Application Priority Data

Oct. 22, 2002   (JP) ............................. 2002-306820

(51) Int. Cl.
*H02K 11/00*    (2006.01)
*H02K 5/00*     (2006.01)
*H02K 5/22*     (2006.01)
*H02K 7/116*    (2006.01)

(52) U.S. Cl. .................... 310/68 R; 310/71; 310/75 R; 310/DIG. 6

(58) Field of Classification Search .................. None
See application file for complete search history.

(56) References Cited

U.S. PATENT DOCUMENTS

| 6,201,326 | B1 * | 3/2001 | Klappenbach et al. .... 310/75 R |
|---|---|---|---|
| 6,707,188 | B2 * | 3/2004 | Torii et al. ................. 310/75 R |
| 6,759,783 | B2 | 7/2004 | Hager et al. |
| 6,903,473 | B2 * | 6/2005 | Matsuyama et al. .......... 310/71 |
| 6,969,933 | B2 * | 11/2005 | Mao et al. ................ 310/75 R |
| 2002/0016087 | A1 | 2/2002 | Breynaert et al. |
| 2002/0079758 | A1 | 6/2002 | Matsuyama et al. |
| 2004/0021379 | A1 | 2/2004 | Breynaert et al. |
| 2004/0066111 | A1 * | 4/2004 | Torii ........................... 310/239 |

FOREIGN PATENT DOCUMENTS

| JP | A-2000-261166 | 9/2000 |
|---|---|---|
| JP | A-2001-15961 | 1/2001 |

* cited by examiner

*Primary Examiner*—Burton Mullins
(74) *Attorney, Agent, or Firm*—Posz Law Group, PLC

(57) ABSTRACT

A motor has a board-retaining part that is attached in an opening portion of a gear housing with a circuit board received in the board-installing portion of the gear housing and that restricts the circuit board to move to a counter-insertion side thereof in an insertion direction of the circuit board. The board-retaining part can be attached to any position not to bring that in contact with the cover member in the direction of the center axis. Thus, in a case of installing the circuit board through the opening portion of the gear housing and blocking the opening with the cover member, it is possible to secure a seal quality of the cover member and to prevent the circuit board from rattling even when a dimensional error is introduced both in approximating and detaching directions of the circuit board and the cover member.

8 Claims, 7 Drawing Sheets

MOTOR

TECHNICAL FIELD

The present invention relates to a motor in which a circuit board is disposed in a gear housing enclosing a speed-reduction mechanism.

BACKGROUND ARTS

Conventionally, a power window system of a vehicle has a motor having a speed-reduction mechanism therein for its drive source. A motor is known in which a circuit board is disposed in a gear housing enclosing the speed-reduction mechanism (refer to JP-2002-262516-A for example).

The gear housing of the motor has an opening portion that faces a motor portion of the motor and a board-installing portion that installs the circuit board inserted through the opening portion in an axial direction of the motor portion. In contrast, a brush holder is fitted to an opening portion of a yoke housing that defines the motor portion. The brush holder is integrally formed with a cover member that blocks the opening portion of the gear housing. Bolts fasten the yoke housing to the gear housing. The motor has a configuration that a fastening torque of the bolts blocks the opening portion of the gear housing with the cover member and clamps the circuit board between the cover member and a board-installing portion's face opposite to the opening portion (a bottom face of the board-installing portion) to hold the circuit board in the board-installing portion.

According to the above-described configuration, however, when a dimensional error is introduced in a direction of pushing the circuit board and the cover member tightly onto each other for instance, the circuit board pushes the cover member to be lifted off the opening portion of the gear housing. This causes a problem of generating a gap between the opening portion and cover member to spoil a seal quality therebetween. On the contrary, when the dimensional error is introduced in a direction of detaching the circuit board and the cover member from each other, the cover member and the bottom face of the board-installing portion cannot clamp the circuit board therebetween. This causes a problem that the circuit board rattles in the board-installing portion and generates an unusual noise. Thus, it is necessary to increase a dimensional accuracy of these components. A control of the dimensional accuracy, however, requires a cumbersome work.

The present invention is achieved to solve the above-described issues. The object of the present invention is to provide a motor configured to have a gear housing that installs a circuit board therein inserted through an opening portion thereof and that a cover member that blocks the opening portion, which can secure a seal quality of the cover member and prevent a rattle of the circuit board even when a dimensional error is introduced both in a direction of pushing the circuit board and the cover member onto each other and in a direction of detaching them from each other.

DISCLOSURE OF THE INVENTION

A motor according to the present invention has a gear housing integrally assembled with a motor portion and enclosing a speed-reduction mechanism for reducing a rotational frequency of the motor portion and a circuit board located in the gear housing. The gear housing has an opening portion facing a side of the motor portion, a board-installing portion holding the circuit board inserted along an imaginary center axis of the motor portion from the opening portion, and a cover member to block the opening portion. Further, the gear housing is provided with a restriction member attached inside of the opening portion and restricting a movement of the circuit board to a counter-insertion side thereof in a direction of the center axis. The restriction member can be able to be attached to any position not to bring the restriction member in contact with the cover member in the direction of the center axis.

According to the present invention, the motor has a restriction member attached in the board-installing portion of the gear housing in which the circuit board is installed to restrict the circuit board to move to a counter-insertion side thereof in the direction of the center axis of the motor portion (in an insertion direction of the circuit board). The restriction member can be attached on any position not to bring the restriction member in contact with the cover member in the direction of the center axis. Thus, even when a dimensional error is introduced in the direction of approximating the circuit board and the cover member to each other, the cover member is prevented to be pushed by the restriction member to be lifted off the opening portion of the gear housing, to secure a seal quality between the opening portion and the cover member. Even when the dimensional error is introduced in a direction of detaching the circuit board and the cover member from each other and when the circuit board has a short length in the insertion direction thereof, the restriction member can be attached to any position to prevent the rattle of the circuit board and to hold the circuit board tightly at all times regardless of the dimensional error.

Desirably, the gear housing has a planiform shape and the circuit board is disposed in parallel with the planiform direction of the gear housing. Thus, it is possible to restrict the dimension of the circuit board-installing portion in a direction perpendicular to the circuit board to decrease the thickness of the gear housing.

Desirably, the restriction member is located approximately at a center of the circuit board in a planiform direction of the gear housing. Thus, even only one restriction member can securely prevent the circuit board from rattling.

The gear housing may be provided with a first and second fixing portions at positions to interpose the circuit board therebetween in a direction perpendicular to the face of the circuit board, to fix the restriction member in such a manner of spanning a clearance between the first and second attachment portions. Here, the restriction member is securely retained in the gear housing to securely prevent the rattle of the circuit board.

Desirably, the restriction member has a holding portion which retains the circuit board in the direction perpendicular to the circuit board. Thus, the circuit board retained by the holding portion can be prevented from rattling both in the insertion direction thereof and in the direction perpendicular thereto.

Further, the restriction member is configured to have elasticity at least in a direction perpendicular to the face of the circuit board and attached in the gear housing to generate an elastically restitutive force. Thus, the restriction member is securely retained by an elastically restitutive force thereof to securely hold the circuit board by the holding portion to securely prevent the rattle of the circuit board.

The other features or advantages of the present invention is disclosed in the descriptions of the embodiment with reference to the drawings below.

BEST MODE FOR CARRYING OUT THE INVENTION

An embodiment of the present invention will be described in the following with reference to accompanying drawings.

Figure 1:
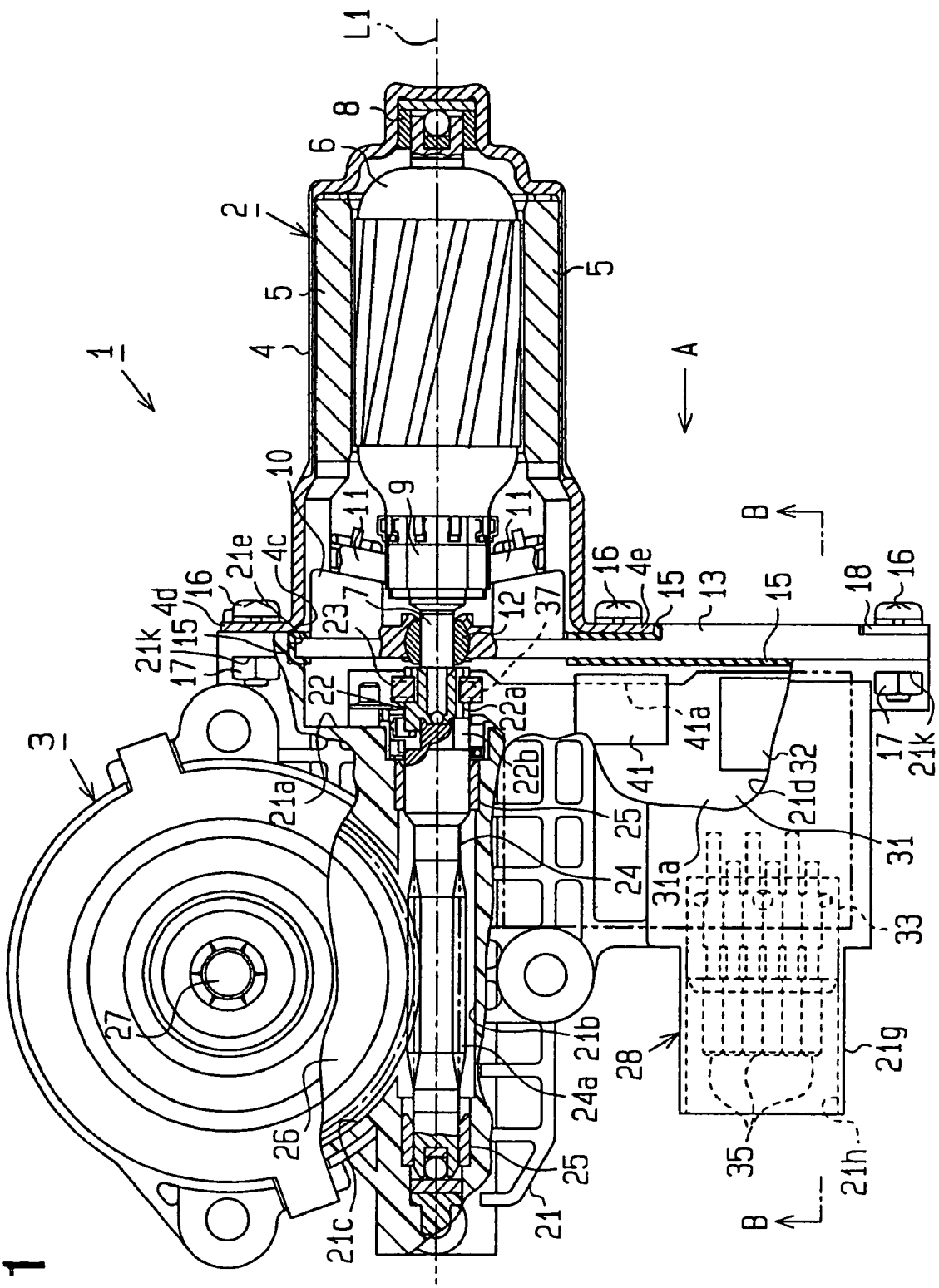
FIG. 1 is a cross-sectional view of a motor according to an embodiment of the present invention.
Figure 2:
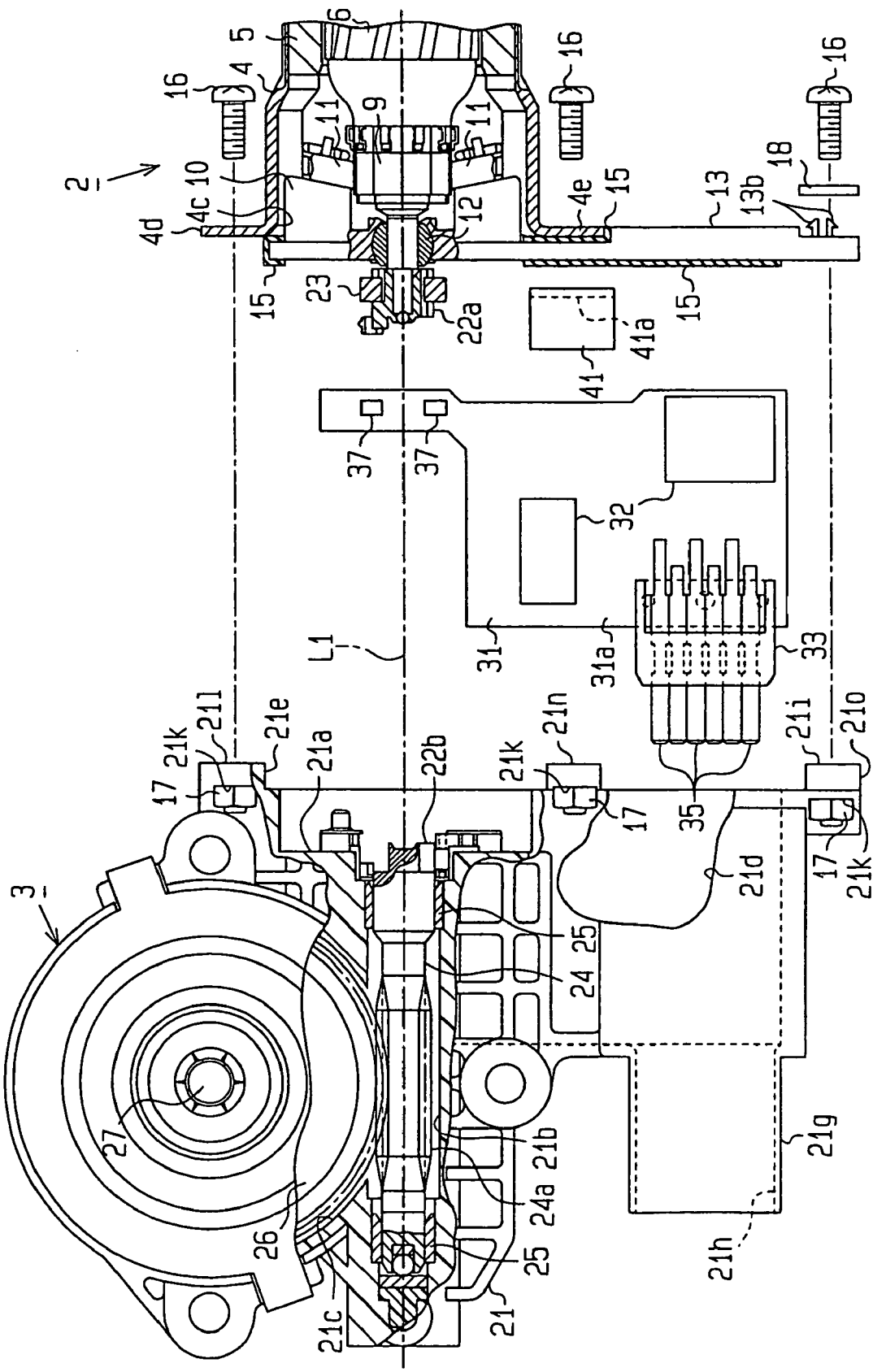
FIG. 2 is a fragmented cross-sectional view of the motor according to the embodiment.
Figure 3:
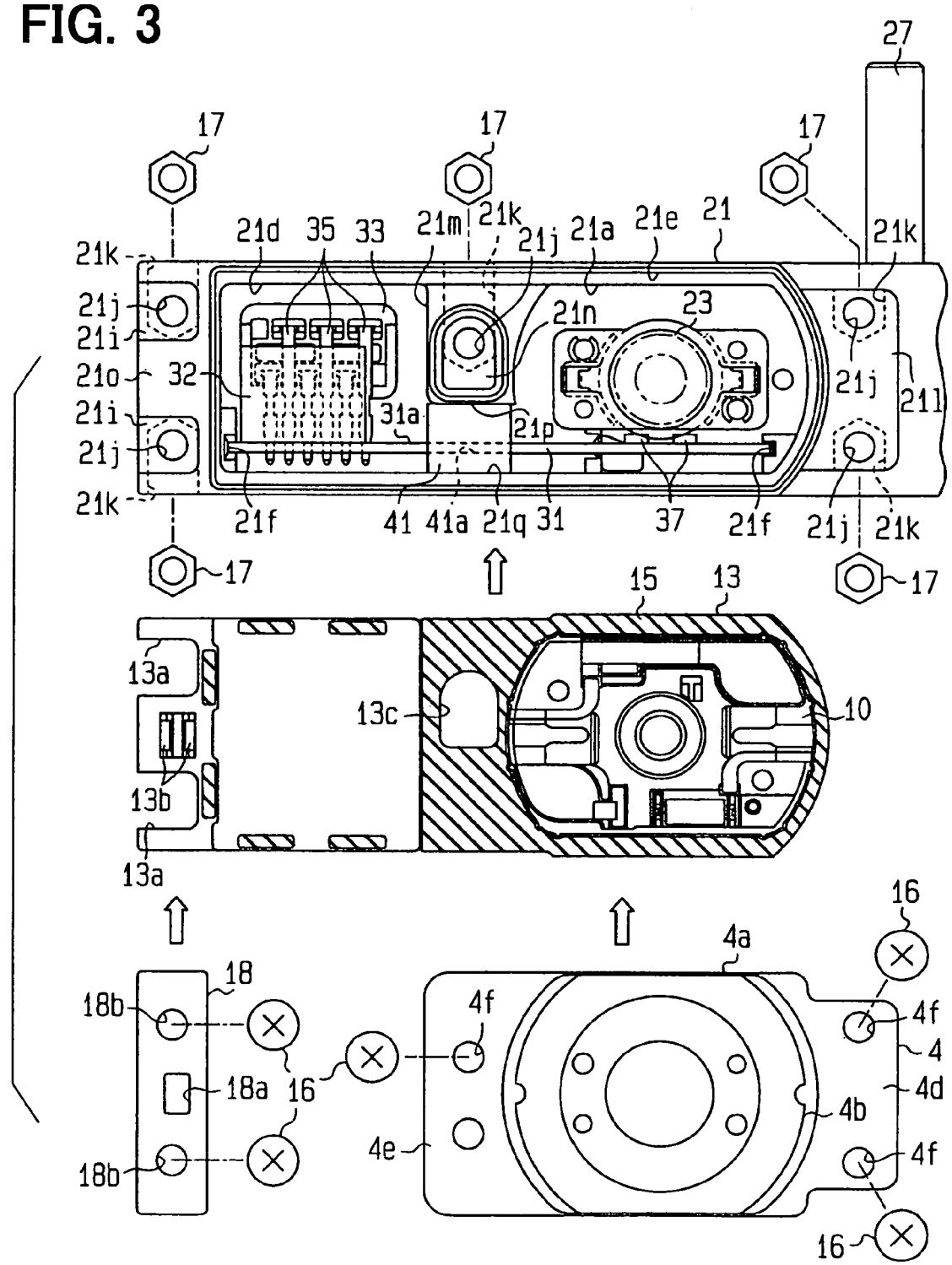
FIG. 3 is a fragmented view of the motor seen in a direction A in FIG. 1.

FIG. 1 depicts a motor 1 having a speed-reduction mechanism according to the embodiment. FIG. 2 is a fragmented view of the motor 1. FIG. 3 is a fragmented view of the motor 1 seen in a direction A in FIG. 1.

As shown in FIGS. 1 to 3, the motor 1 is a drive source of a power window system for a vehicle. The motor 1 is composed by integrally assembling a motor portion 2 and a speed-reduction portion 3 for reducing a rotational frequency of the motor portion 2.

As shown in FIG. 3, the motor portion 2 has a yoke housing 4 having a partially depressed cylindrical shape with a pair of flat side faces 4a, a pair of curved side faces 4b connecting rims of the flat side faces 4a and a bottom. The yoke housing 4 is made of a magnetic metal material, fixes a plurality of magnets 5 at a predetermined positions on an internal circumference thereof and rotatably installs an armature 6 inward of the plurality of magnets 5. The armature 6 has a rotation shaft 7. A bearing 8 is provided at the bottom of the yoke housing 4 to rotatably support a start end portion of the rotation shaft 7. A commutator 9 is fixed on a terminal end portion of the rotation shaft 7.

A brush holder 10 is fitted to an opening portion 4c of the yoke housing 4. The brush holder 10 supports a pair of brushes 11 that is in slide contact with the commutator 9. The brush holder 10 holds a bearing 12 at a center portion thereof. The bearing 12 rotatably supports the terminal end portion of the rotation shaft 7. The brush holder 10 is integrally formed with a cover member 13.

The cover member 13, together with the brush holder 10, is made of a resin material and interposed between the opening portion 4c of the yoke housing 4 and an opening portion 21e of a gear housing 21, which will be described below, to block both the opening portions 4c, 21e. The cover member 13 is integrally formed by a two-color molding with a seal member 15 made of an elastomer resin, etc. The seal member 15 is disposed at positions suitable for sealing the opening portion 4c of the yoke housing 4 and the opening portion 21e of the gear housing 21. The seal member 15 prevents a water immersion through the opening portion 4c of the yoke housing 4 and the opening portion 21e of the gear housing 21. The cover member 13 sealing the opening portion 4c of the yoke housing 4 restricts brush particles generated by the slide contact of the brushes 11 from dispersing toward a clutch 22 and a circuit board 31, which are described below, to prevent an erroneous operation of the motor 1.

The above-described cover member 13 is fitted to the opening portion 21e of the gear housing 21 in a condition that the brush holder 10 is fitted to the yoke housing 4. The yoke housing 4 and the gear housing 21 are fixed to each other by fastening them with bolts 16 and nuts 17 at predetermined three points to interpose the cover member 13 therebetween. The cover member 13 is further fixed to the gear housing 21 with the blots 16 and the nuts 17 at predetermined two points at a peripheral portion thereof apart from the yoke housing 4. Here, the bolts 16 and nuts 17 fasten the peripheral portion of the cover member 13 interposed between the gear housing 21 and a metal plate 18.

Fixing parts of the yoke housing 4 will be described. First, a fixing part at a right portion of the yoke housing 4 in FIG. 3 will be described in detail. The gear housing 21 is formed to have a fixing portion 21l to fix a right portion of the yoke housing 4 thereto. The fixing portion 21l has bolt insertion holes 21j to insert the bolts 16 therethrough at each an upper and a lower ends in FIG. 3. The fixing portion 21l has nut-retaining hollows 21k on outer end faces thereof respectively in communication with the bolt insertion holes 21j and retaining the nuts 17 therein.

Next, another fixing part at a left portion of the yoke housing 4 in FIG. 3 will be described in detail. The gear housing has another fixing portion 21m at an approximately center portion thereof in a lateral direction in FIG. 3 to extend from an upper portion of the opening portion 21e to an approximately middle portion thereof. The fixing portion 21m has a fitting projection 21n protruding toward the motor portion 2. The fitting projection 21n has a bolt insertion hole 21j to insert the bolt 16 therethrough. The fixing portion 21m has a nut-retaining hollow 21k on outer end faces thereof respectively in communication with the bolt insertion holes 21j and retaining the nuts 17 therein.

The cover member 13 has a fitting hole 13c at an approximately center portion thereof to fit the fitting projection 21n therein. Here, the seal member 15 is disposed on an entire face of an internal circumference of the fitting hole 13c. Further, the yoke housing 4 has a pair of fixing flanges 4d, 4e at both sides thereof in a longitudinal direction of the opening portion 21e respectively in accordance with the fixing portions 21l, 21m. Each the fixing flanges 4d, 4e has bolt insertion holes 4f at positions in accordance with the bolt insertion holes 21j.

Further, still another fixing part having the metal plate 18 will be described in detail. The gear housing 21 has a still another fixing portion 21o to fix a left end portion of the cover member 13 thereto. The fixing portion 21o has two fitting projection 21i protruding toward the motor portion 2. The fitting projections 21i respectively have a bolt insertion hole 21j to insert the bolt 16 therethrough. The fixing portion 21o has a nut-retaining hollow 21k on outer end faces thereof respectively in communication with the bolt insertion holes 21j and retaining the nuts 17 therein.

The cover member 13 has notches 13 at the left end portion thereof to fit the fitting projections 21i therein. The cover member 13 further has engaging hooks 13b between the notches 13 to attach the metal plate 18 thereon. Further, the metal plate 18 has an engaging hole 18a to be engaged with the engaging hooks 13b and bolt insertion holes 18b at positions in accordance with the bolt insertion holes 21j.

To put the cover member 13 and the yoke housing 4 together, firstly, the cover member 13 (the brush holder 10) is placed on the opening portion 21e of the yoke housing 4. Then the cover member 13 is mounted to the opening portion 21e of the gear housing 21 to fit the fitting hole 13c and the notches 13a of the cover member 13 to the fitting projections 21n, 21i. Secondly, the metal plate 18 is mounted on the cover member 13 to engage the engaging hooks 13b with the engaging hole 18a. Thirdly, bolts 16 are inserted in the bolt insertion holes 4f, 18b, 21j and fastened to the nuts 17 retained in the nut-retaining hollows 21k to fix the cover member 13 and the yoke housing 4 to the gear housing 21.

The speed-reduction portion 3 includes the gear housing 21 made of resin. The gear housing 21 has an opening-side installing portion 21a enclosing the rotation shaft 7 and the clutch 22, which will be described below, a worm shaft-installing portion 21b extending from the opening-side installing portion 21a toward an imaginary center axis L1 of the motor portion 2 (the rotation shaft 7), a worm wheel-installing portion 21c extending from the worm shaft-installing portion 21b in a direction perpendicular to the center axis L1 and parallel with the flat side faces 4a of the yoke housing 4 and a board-installing portion 21d communicated to the opening-side installing portion 21a and extending to a side opposite to the worm wheel-installing portion 21c relative to the worm shaft-installing portion 21b. That is, the gear housing has a planiform shape. The planiform direction of the gear housing 21 is in parallel with the flat side faces 4a of the yoke housing 4 and in parallel with the planiform direction of the motor 1.

The opening-side installing portion 21a and the board-installing portion 21d have an integrally formed opening portion 21e facing the motor portion 2. The opening-side installing portion 21a installs the clutch 22 therein connecting the rotation shaft 7 and the worm shaft 24 which will be described below. The clutch 22 has a driving side portion 22a. The driving side portion 22a is fixed to and integrally rotates with the terminal end portion of the rotation shaft 7. The opening portion 21e has a sensor magnet 23 on an inner circumference thereof to detect a rotation of the rotation shaft 7.

Here, the clutch 22 includes the driving side portion 22a and a driven side portion 22b integrally rotating with the worm shaft 24, which will be described below. The clutch 22 is configured to transmit a torque of the of the driving side portion 22a directly to the driven side portion 22b. The clutch 22 does not transmit a torque of the driven side portion 22b to the driving side portion 22a and locks a rotation of the driven side portion 22b. That is, the clutch 22 transmits the torque of the rotation shaft 7 driven by the motor portion 2 to the worm shaft 24 to open and close a window glass. When driven side portion 22b has a torque, the clutch 22 locks the driven side portion 22b to prevent the window glass from descending. The clutch 22 is assembled in joining the motor portion 2 and the speed-reduction portion 3 to each other.

The worm shaft-installing portion 21b encloses a pair of bearings 25 to rotatably support the worm shaft 24 integrally formed with a worm 24a. The worm shaft 24 is provided at the start end portion thereof with the driven side portion 22b of the clutch 22 integrally rotating with the worm shaft 24.

The worm wheel-installing portion 21c rotatably encloses the worm wheel 26 engaging with the worm 24a. The worm wheel 26 and the worm shaft 24 compose the speed-reduction mechanism. The worm wheel 26 is provided at a center portion thereof with an output shaft 27 integrally rotating with the worm wheel 26 and to be connected to a window regulator (not shown) of the power window system. The worm wheel 26 transmits the torque of the worm 24 to the output shaft 27 to drive the window regulator.

The board-installing portion 21d encloses the circuit board 31 having a control circuit for controlling the rotation of the motor 1. The circuit board 31 mounts a plurality of circuit devices 32 thereon to form the control circuit. The board-installing portion 21d has guide grooves 31a formed in parallel with the center axis L1 to guide both side ends of the circuit board 31 inserted in the board-installing portion 21d. That is, the circuit board 31 is inserted into the board-installing portion 21d to be along the guide grooves 21f and in such a manner that a device mounting face 31a thereof to mount the circuit devices 31 is in parallel with the planiform direction of the gear housing 21.

As shown in FIGS. 1 to 3, a pair of Hall effect devices 37 is disposed on the circuit board 31 to face an outer circumference of the sensor magnet 23. The Hall effect devices 37 detect a variation of the magnetic field of the sensor magnet 23 integrally rotating with the rotation shaft 7. Based on detection signals of the Hall effect devices 37, rotation information such as a rotation frequency and a rotation speed of the rotation shaft 7 is detected to control the motor 1.

Figure 4:
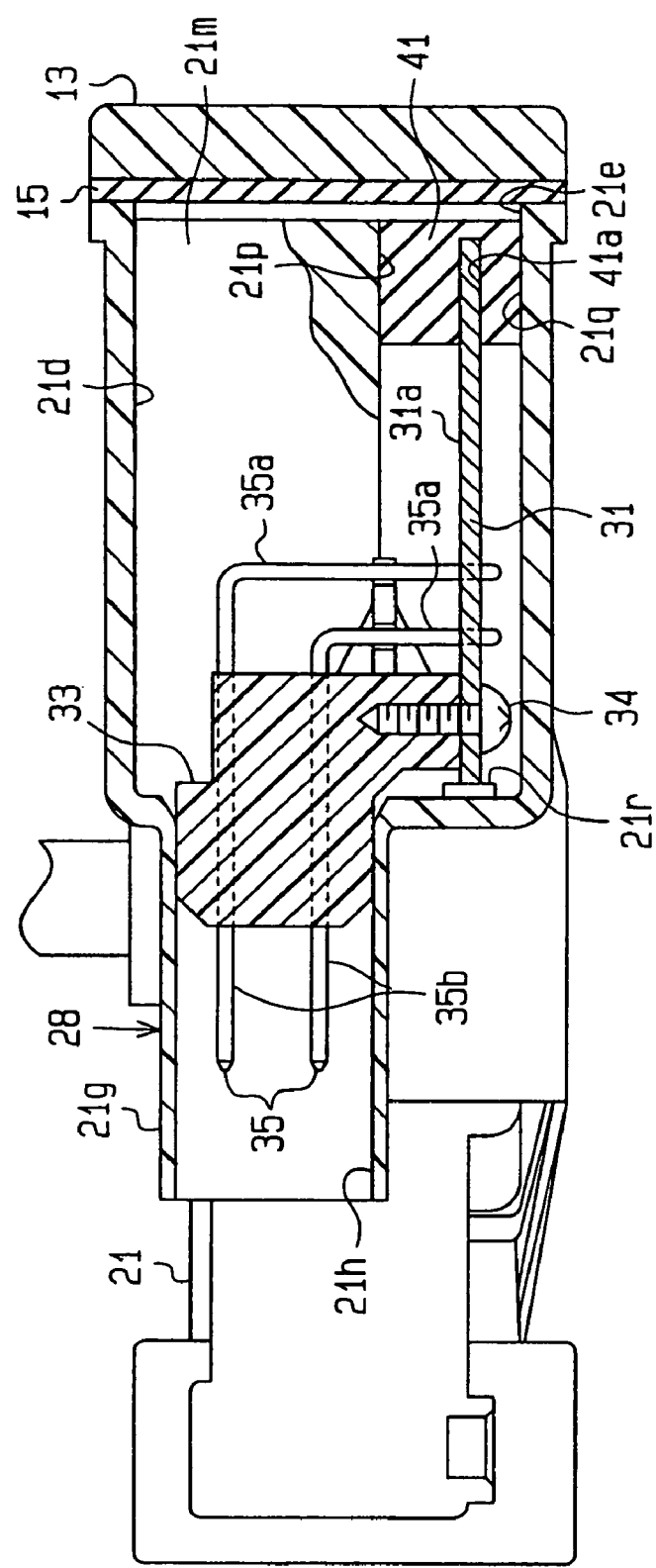
FIG. 4 is a cross-sectional view taken along a line B—B in FIG. 1.

As shown in FIG. 4, a connector body 33 is fixed on the circuit board 31 by a screw 34. The connector body 33 holds six terminals 35 respectively at predetermined portions thereof. The start ends of the terminal 35 are electrically connected to the circuit board 31. Here, the gear housing 21 has a connector case portion 21g extending in parallel with the center axis L1. The connector case portion 21g has a communication hole 21h formed to extend along the center axis L1 and to communicate the board-installing portion 21d with an outer space. The connector body 33 is fitted to and inserted in the communication hole 21h to expose the terminals 35 in the communication hole 21h.

The connector case portion 21g and the connector body 33 compose a connector portion 28 of the motor 1. An electrical connection of the connector portion 28 and a vehicle side connector extended from the vehicle realizes an electric power supply to the motor 1 and an exchange of control signals between the motor 1 and the vehicle. At an assembly of the motor 1, the circuit board 31 is connected to a connection terminal (not shown) inserted in the cover member 13 and electrically connected to the brush 11 to supplies a driving power through the control circuit to the brush 11.

As shown in FIGS. 3 and 4, after installing the circuit board 31 in the board-installing portion 21d, a board-retaining part 41 is attached to the gear housing 21 as a restriction member of the present invention. The board-retaining part 41 is made of an elastic material in an approximately rectangular parallelepiped shape. The board-retaining part 41 has a notch extending from one end face toward another end face to form a holding portion 41a to hold the circuit board 31 in a direction perpendicular to a face of the circuit board 31. The board-retaining part 41 holds an approximately center portion of the circuit board 31 in a lateral direction in FIG. 3 (in the planiform direction of the gear housing 21). Further, the board-retaining part 41 is compressed and press-fitted in a clearance between a bottom face 21p of the fixing portion (a first attachment portion) 21m, which is disposed approximately at a center of the opening portion 21e of the gear housing 21, and an inner face (a second attachment portion) 21q of the gear housing 21, which faces the bottom face 21p to be spanned therebetween. Thus, the board-retaining part 41 is securely retained by an elastically restitutive force thereof not to move in the clearance between the bottom face 21p of the fixing portion 21m and the inner face 21q of the gear housing 21. The board-retaining part 41 securely holds the circuit board 31 by the holding portion 41a to restrict the circuit board 31 to move to a counter-insertion side thereof in a direction of the center axis L1. That is, the board-retaining part 41 prevents the circuit board 31 from rattling.

Further, the board-retaining part 41 has a dimension to prevent that the board-retaining part 41 and the cover member 13 from coming in contact with each other even when a maximum dimensional error is introduced in a direction of proximity of the circuit board 31 and the cover member 13. Thus, even when a dimensional error is introduced in the direction, the board-retaining part 41 prevents the cover member 13 from being pushed and lifting off the opening portion 21e of the gear housing 21, to secure a seal quality between the opening portion 21e and the cover member 13. Even when the dimensional error is introduced in a direction of detaching the circuit board 31 and the cover member 13 from each other and when the circuit board 31 has a short length in the insertion direction thereof, the board-retaining part 41 can be attached to any position to prevent the circuit board 31 from rattling and to hold the circuit board 31 tightly at all times regardless of the dimensional error. Furthermore, the board-retaining part 41 holds an approximately center portion of the circuit board 31 in a lateral direction in FIG. 3 at a side of the motor portion 2 by the holding portion 52a to securely hold the circuit board 31.

Next, featured actions and effects of the motor 1 according to the embodiment will be described.

(1) The motor 1 has the board-retaining part 41 attached in the board-installing portion 21d of the gear housing 21 in which the circuit board 31 is installed to restrict the circuit board 31 to move to the counter-insertion side thereof in the direction of the center axis L1 of the motor portion 2 (in a direction of inserting the circuit board 31). The board-retaining part 41 can be attached at any position not to bring the board-retaining part 41 in contact with the cover member 13 in the direction of the center axis L1. Thus, even when a dimensional error is introduced in the direction of approximating the circuit board 31 and the cover member 13 to each other, the board-retaining part 41 prevents the cover member 13 from being pushed and lifting off the opening portion 21e of the gear housing 21, to secure a seal quality between the opening portion 21e and the cover member 13. Even when the dimensional error is introduced in a direction of detaching the circuit board 31 and the cover member 13 from each other and when the circuit board 31 has a short length in the insertion direction thereof, the board-retaining part 41 can be fixed to a position suitable for preventing the rattle of the circuit board 31 to hold the circuit board 31 tightly at all times regardless of the dimensional error. Furthermore, the board-retaining part 41 holds an approximately center portion of the circuit board 31 in a lateral direction in FIG. 3 at a side of the motor portion 2 by the holding portion 52a to securely hold the circuit board 31.

(2) The circuit board 31 is disposed in parallel with the planiform direction of the gear housing 21. Thus, it is possible to restrict the dimension of the circuit board-installing portion 21d in a direction perpendicular to the circuit board 31 to decrease the thickness of the gear housing 21.

(3) The board-retaining part 41 is located approximately at the center of the circuit board 31 in the planiform direction of the gear housing 21. Thus, even only one board-retaining part 41 can securely prevent the circuit board 31 from rattling.

(4) The board-retaining part 41 is fixed in the clearance between a bottom face 21p of the fixing portion 21m, which is disposed approximately at a position to hold the circuit board 31 in a direction perpendicular to the face of the circuit board 31, and the inner face 21q of the gear housing 21, which faces the bottom face 21p to be spanned therebetween. Thus, the board-retaining part 41 is securely retained in the gear housing 21 to prevent the circuit board 31 from rattling both in the insertion direction of the circuit board 31 and in the direction perpendicular to the face of the circuit board 31.

(5) The board-retaining part 41 has the holding portion 41a to retain the circuit board 31 in the direction perpendicular to the circuit board 31. Thus, the circuit board 31 retained by the holding portion 41a can be prevented from rattling both in the insertion direction thereof and in the direction perpendicular thereto.

(6) The board-retaining part 41 is made of an elastic material and press-fitted in the gear housing 21 to generate the elastically restitutive force in the direction perpendicular to the face of the circuit board 31. Thus, the elastically restitutive force of the board-retaining part 41 can securely fix the board-retaining part 41 in the gear housing 21 and can securely hold the circuit board 31 at the holding portion 41a. Accordingly, the board-retaining part 41 prevents the circuit board 31 from rattling.

(7) The board-retaining part 41 made of an elastic material can be easily formed.

(8) Because board-retaining part 41 is compressed and press-fitted in the clearance between the bottom face 21p of the fixing portion 21m and the inner face 21q of the gear housing 21 facing the bottom face 21p, to be able to be easily attached in the gear housing 21.

In addition, the embodiment of the present invention can be modified as follows.

In the above-described embodiment, the board-retaining part 41 made of an elastic material serves as the restriction member of the present invention to restrict the position of the circuit board 31 to prevent the rattle thereof. The restriction member, however, is not limited to the board-retaining part 41 and can be modified accordingly. For example, a member such as a board-retaining part 42 shown in FIGS. 6 and 7 can be used as the restriction member.

Figure 5:
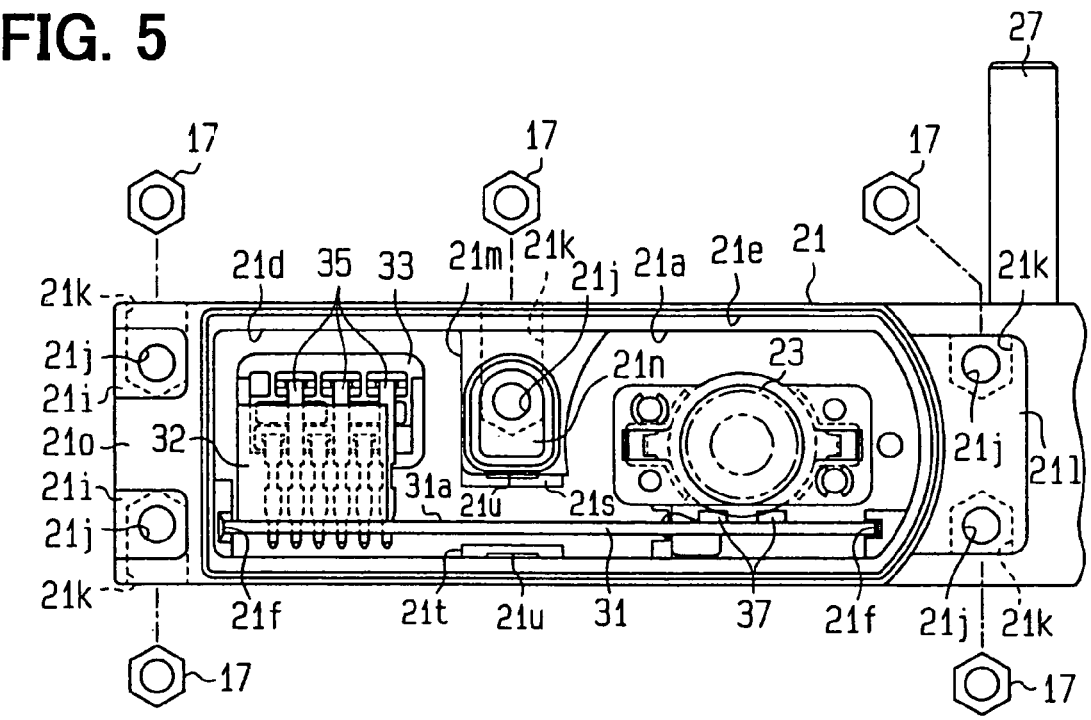
FIG. 5 is a fragmented view of a motor seen in the direction A in FIG. 1 according to another embodiment.
Figure 6:
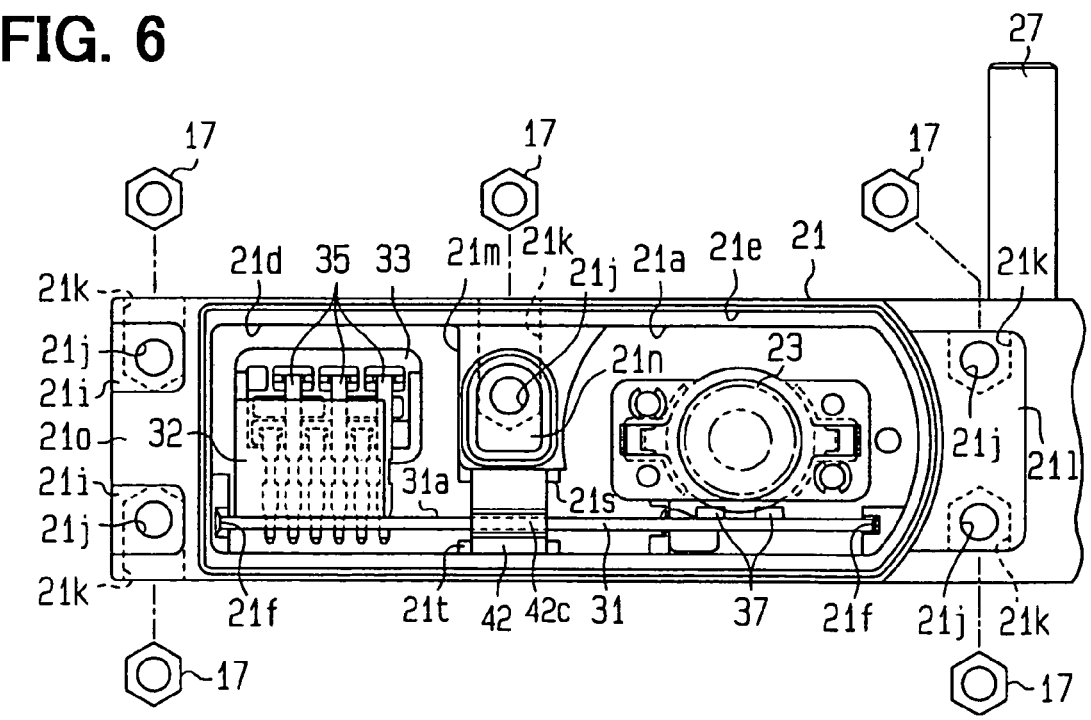
FIG. 6 is a fragmented view of the motor seen in the direction A in FIG. 1 according to another embodiment.
Figure 7:
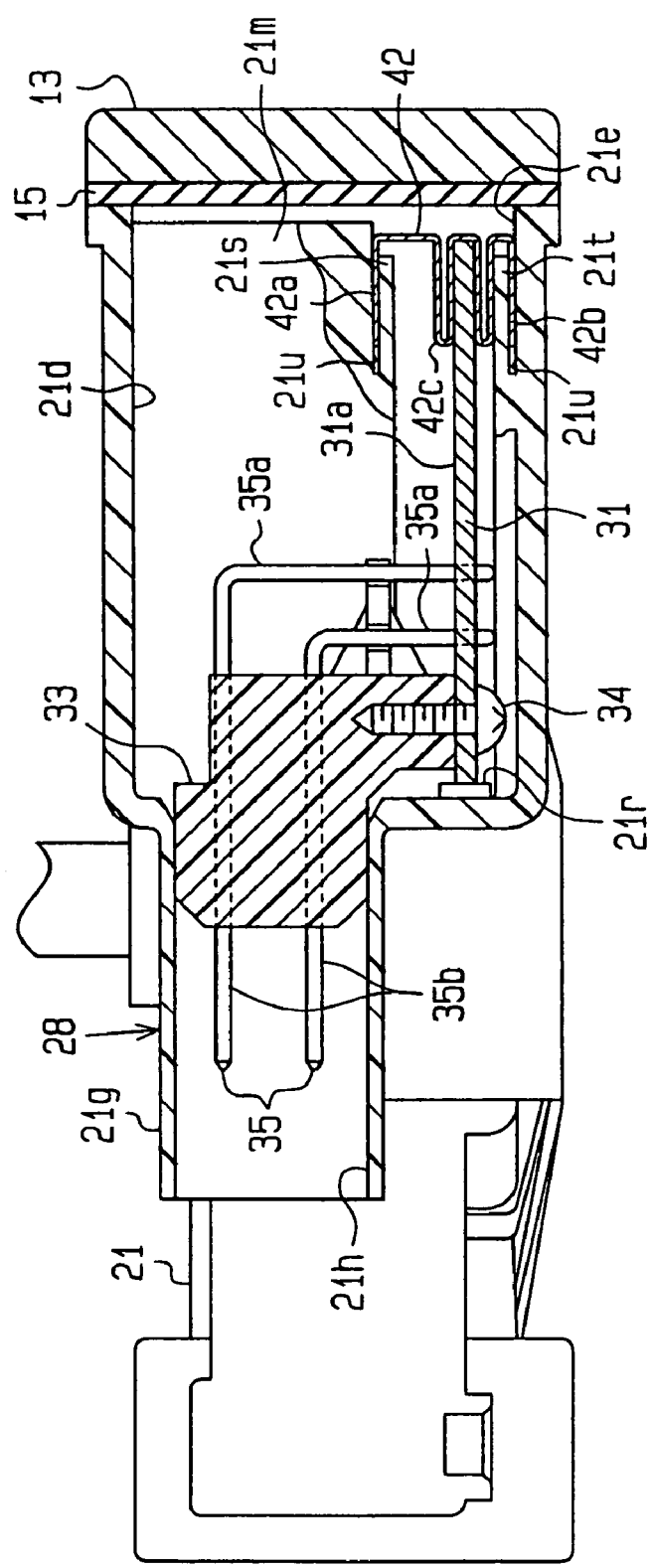
FIG. 7 is a cross-sectional view taken along the line B—B in FIG. 1 according to another embodiment.

As shown in FIGS. 6 and 7, the board-retaining part 42 is a metal plate folded in horseshoe shapes to have three steps. The both end portions are inserting portions 42a, 42b and the middle portion is the holding portion 42c. The holding portion 42c is formed to have an elastic force in a direction perpendicular to the face of the circuit board 31. As shown in FIG. 5, the gear housing 21 has an attachment portion (a first attachment portion) 21s formed at a lower portion of the fixing portion 21m disposed at approximately center portion of the opening portion 21e, and another attachment portion (a second attachment portion) 21t at a position facing the attachment portion 21s. The attachment portions 21s, 21t each have notches 21u for press-fitting the inserting portions 42a, 42b of the board-retaining part 42.

Then, the board-retaining part 42 holds the circuit board 31 at the holding portion 42s and press-fitted in the inserting portions 42a, 42b in the press-fitting notches 21u of the attachment portions 21s, 21t to be fixed to the gear housing 21. Here, as similar as in the above-described embodiment, the dimensions of the board-retaining part 42 itself, the attachment portions 21s, 21t the circuit board 31, the board-installing portion 21d and so on are set so that the board-retaining part 42 and the cover member does not come in contact with each other even when a maximum dimensional error is introduced in a direction of proximity of the circuit board 31 and the cover member 13.

Here, the board-retaining part 42 can be attached at corresponding positions in the direction of the center axis L1, by adjusting an insertion depth of the inserting portions 42a, 42b into the notches 21u. Thus, as similar as in the above-described embodiment, the board-retaining part 42 can secure the seal quality of the cover member 13 and prevent the rattle of the circuit board 31 even when a dimensional error is introduced in an approaching or estranging direction of the circuit board 31 and the cover member 13. The board-retaining part 42 holds the circuit board approximately at a center thereof in a lateral direction in FIG. 6 (in the planiform direction of the gear housing 21j. Thus, even one board-retaining part 42 can securely prevent the rattle of the circuit board 31. Further, the board-retaining part 42 is disposed to be spanned between the attachment portions 21s, 21t. Thus, the board-retaining part 42 can be securely fixed in the gear housing 21. Furthermore, the elastically restitutive force of the holding portion 42c securely holds the circuit board 31. Thus, the board-retaining part 42 prevents the circuit board 31 to rattle both in the insertion direction of the circuit board 31 and in the direction perpendicular to the face of the circuit board 31.

The shape of the board-retaining parts 41, 42 can be modified accordingly. Here, the configuration of the fixing portions should also be modified in accordance with the modification of the shape of the board-retaining parts 41, 42. The arrangement of the board-retaining parts 41, 42 also can be modified. The number of the board-retaining parts 41, 42 can be more than two. The board-retaining parts 41, 42 can be fixed to the gear housing 21 with screws.

Figure 8:
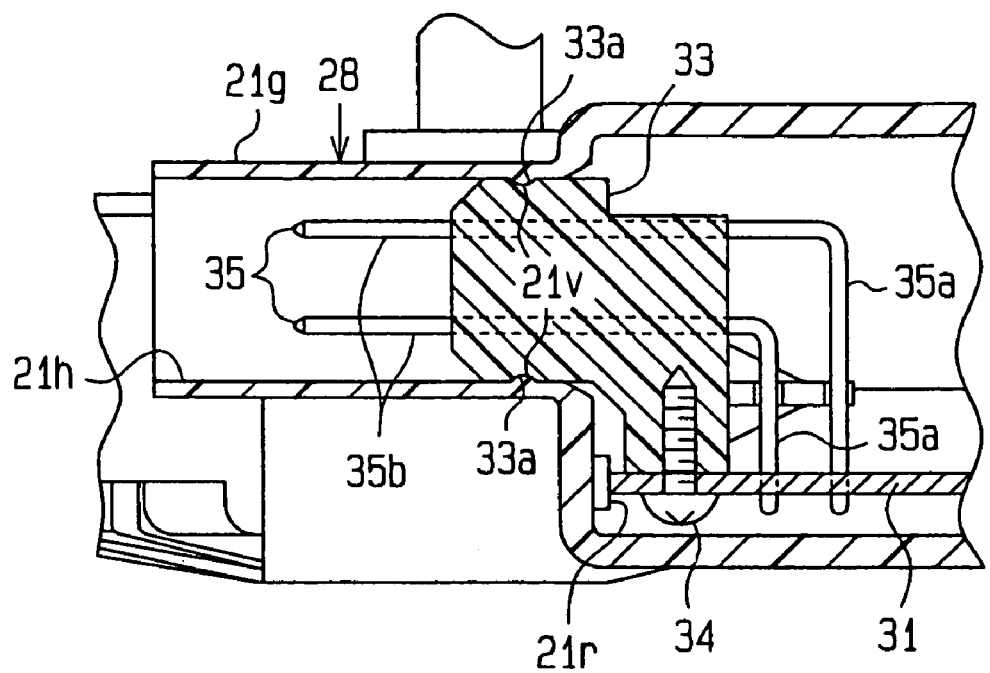
FIG. 8 is an enlarged cross-sectional view of a principal portion taken along the line B—B of FIG. 1 according to still another embodiment.
Figure 9:
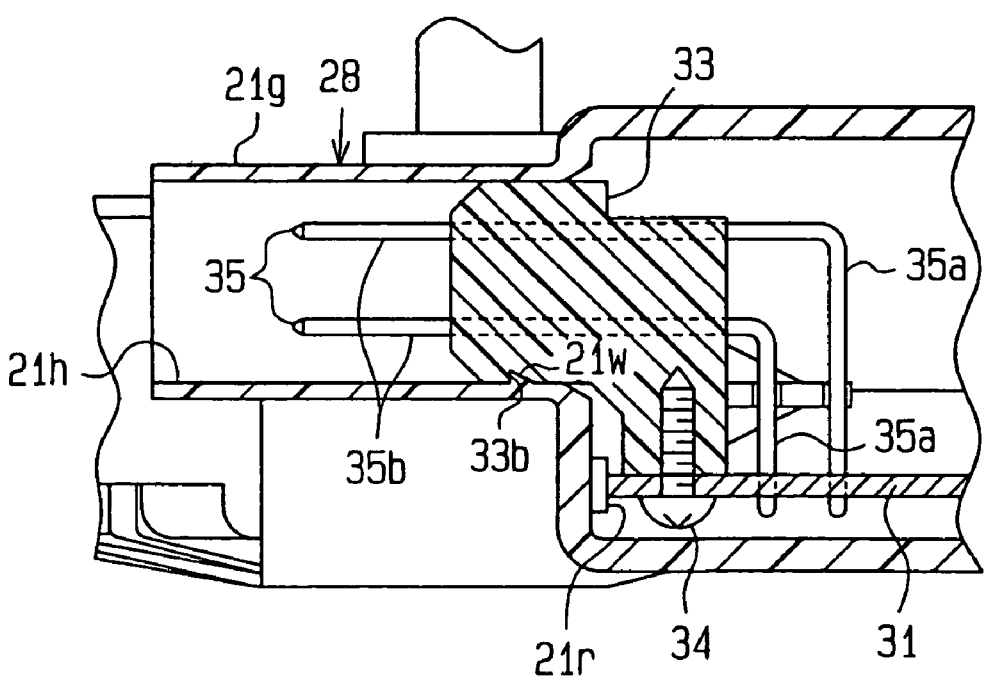
FIG. 9 is an enlarged cross-sectional view of a principal portion taken along the line B—B of FIG. 1 according to still another embodiment.

To prevent the rattle of the circuit board 31 more securely than in the above-described embodiment, an assembly can be employed as shown in FIGS. 8 and 9. That is, as shown in FIG. 8, the communication hole 21h of the connector case portion 21g has an approximately hemisphere-shaped projections 21v formed on upper and lower portion of an inner face thereof.

Accordingly, the connector body 33 has concavities 33a to be engaged with the projections 21v. Further, as shown in FIG. 9, the communication hole 21h of the connector case portion 21g has another projection having a triangular section on the lower inner face thereof, and the connector body 33 has another concavity to be engaged with the another projection 21w. Thus, the connector body 33 (the circuit board 31) and the connector case portion 21g (the gear housing 21) engage with each other to prevent the rattle of the circuit board 31 more securely.

The structure of each component of the motor 1 such as the motor portion 2, the speed-reduction portion 3 and the circuit board 31 is not limited to those as in the above-described embodiments, and can be modified accordingly.

The motor 1 of the above-described embodiment is applied to an power source of the power window system of a vehicle. The present invention, however, can be applied to a motor for other appliances.

The invention claimed is:

1. A motor comprising a motor portion and a gear housing integrally assembled together with the motor portion, the gear housing enclosing a speed-reduction mechanism for reducing a rotational speed of the motor portion, the gear housing receiving a circuit board therein, the motor further comprising:

an opening portion facing the motor portion;

a board-installing portion to hold the circuit board inserted through the opening portion and along an axial direction defined along a center of the motor portion, wherein the circuit board is disposed in the board-installing portion in such a manner that a plane of the circuit board extends along an axial direction of the motor portion;

a cover member to block the opening portion; and a restriction member fixed inside the opening portion and restricting the circuit board from moving to a counter-insertion side of the circuit board in the axial direction, the restriction member is installable at a predetermined position in which the restriction member is limited from contacting with the cover member in the axial direction.

2. The motor according to the claim 1, wherein:

the gear housing is formed in a planiform shape along an axial direction of the motor portion; and a direction of a plane of the circuit board is disposed along a planiform direction of the gear housing.

3. The motor according to the claim 1, wherein the restriction member has a holding portion holding the circuit board in a direction perpendicular to a plane of the circuit board.

4. The motor according to claim 1, wherein the circuit board is sandwiched between the restriction member and a bottom surface of the board-installing portion.

5. The motor according to claim 1, further comprising a brush holder that is integrated with the cover member.

6. A motor comprising a motor portion and a gear housing integrally assembled together with the motor portion, the gear housing enclosing a speed-reduction mechanism for reducing a rotational speed of the motor portion, the gear housing receiving a circuit board therein, the motor further comprising:

an opening portion facing the motor portion;

a board-installing portion to hold the circuit board inserted through the opening portion and along an axial direction defined along a center of the motor portion;

a cover member to block the opening portion; and a restriction member fixed inside the opening portion and restricting the circuit board from moving to a counter-insertion side of the circuit board in the axial direction, the restriction member is installable at a predetermined position in which the restriction member is limited from contacting with the cover member in the axial direction, wherein:

the gear housing is formed in a planiform shape;

a direction of a plane of the circuit board is disposed along a planiform direction of the gear housing; and the restriction member is disposed at approximately center portion of the circuit board in the planiform direction of the gear housing.

7. A motor comprising a motor portion and a gear housing integrally assembled together with the motor portion, the gear housing enclosing a speed-reduction mechanism for reducing a rotational speed of the motor portion, the gear housing receiving a circuit board therein, the motor further comprising:

an opening portion facing the motor portion;
a board-installing portion to hold the circuit board inserted through the opening portion and along an axial direction defined along a center of the motor portion; and
a cover member to block the opening portion;
a restriction member fixed inside the opening portion and restricting the circuit board from moving to a counter-insertion side of the circuit board in the axial direction, the restriction member is installable at a predetermined position in which the restriction member is limited from contacting with the cover member in the axial direction, wherein:
the gear housing is provided with a first attachment portion and a second attachment portion to interpose the circuit board therebetween in a direction perpendicular to a plane of the circuit board; and
the restriction member is fixed to span a clearance between the first attachment portion and the second attachment portion.

8. A motor comprising a motor portion and a gear housing integrally assembled together with the motor portion, the gear housing enclosing a speed-reduction mechanism for reducing a rotational speed of the motor portion, the gear housing receiving a circuit board therein, the motor further comprising:

an opening portion facing the motor portion;
a board-installing portion to hold the circuit board inserted through the opening portion and along an axial direction defined along a center of the motor portion; and
a cover member to block the opening portion, and
a restriction member fixed inside the opening portion and restricting the circuit board from moving to a counter-insertion side of the circuit board in the axial direction, the restriction member is installable at a predetermined position in which the restriction member is limited from contacting with the cover member in the axial direction,
wherein the restriction member has a holding portion holding the circuit board in a direction perpendicular to a direction of a plane of the circuit board, wherein the restriction member is formed to have an elastic force at least in the direction perpendicular to the direction of the plane of the circuit board and attached to the gear housing to generate the elastic force.

* * * * *